M. CLARK.
POULTRY DRINKING FOUNTAIN.
APPLICATION FILED JAN. 16, 1915.
1,210,601.
Patented Jan. 2, 1917.
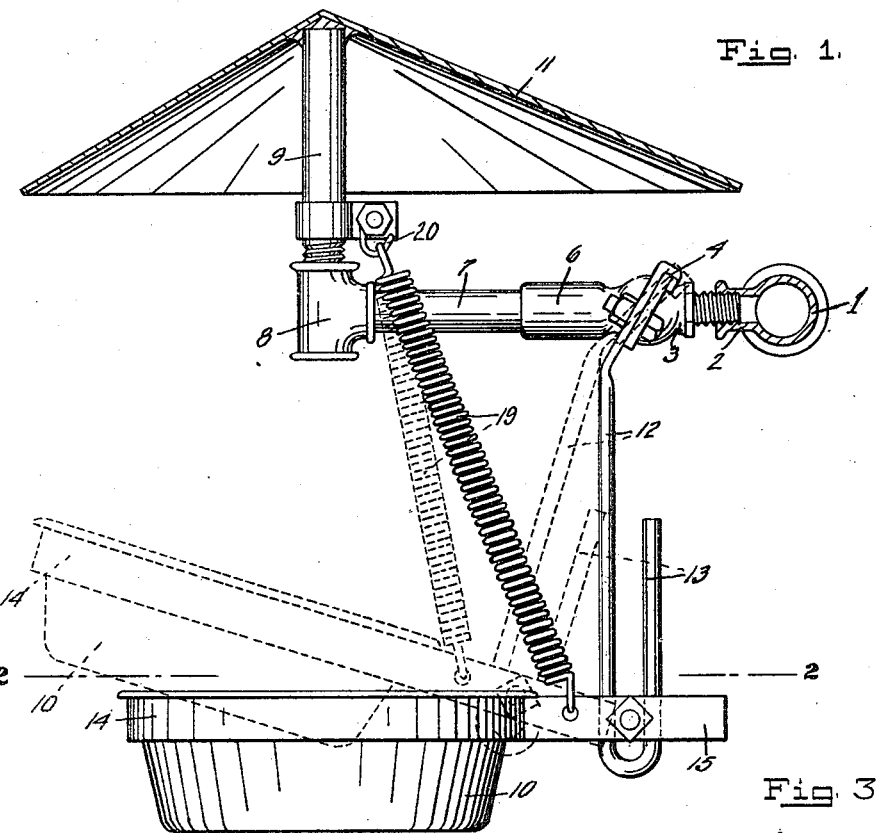
Fig. 1.
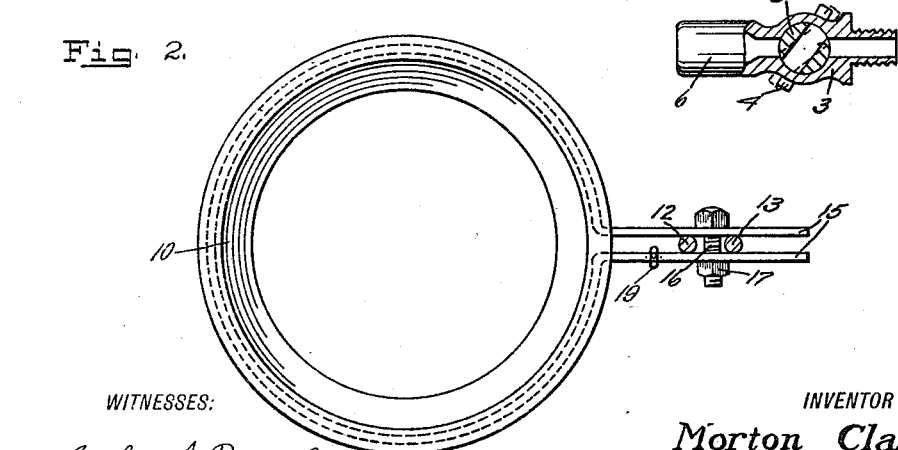
Fig. 2.
Fig. 3.
WITNESSES:
Charles L. Reynolds.
Horace Barnes
INVENTOR
Morton Clark
BY
Pierre Barnes
ATTORNEY

UNITED STATES PATENT OFFICE.

MORTON CLARK, OF SEATTLE, WASHINGTON.

POULTRY DRINKING-FOUNTAIN.

1,210,601.   Specification of Letters Patent.   Patented Jan. 2, 1917.

Application filed January 16, 1915. Serial No. 2,524.

*To all whom it may concern:*

Be it known that I, MORTON CLARK, a citizen of the United States, residing at Seattle, in the county of King and State of Washington, have invented certain new and useful Improvements in Poultry Drinking-Fountains, of which the following is a specification.

My invention relates to poultry drinking-fountains.

The object of my invention is to provide a drinking fountain for poultry in which the water in the receptacle may be kept at a predetermined height at all times.

Another object is to provide a fountain of simple and relatively cheap construction, and one which cannot be interfered with or the water unnecessarily splashed about by the poultry.

A further object is to provide a drinking fountain whose height from the ground may be regulated to serve young chicks or full-grown fowls.

The invention consists in the novel construction of a poultry fountain, and the combination and adaptation of its various parts, as will be fully described in the following specification, illustrated in the accompanying drawings, and finally pointed out in the appended claims.

In the accompanying drawings I have shown my invention in its present preferred form, and it will be understood that the same may be modified to a considerable extent within the scope of the claims limited only by the prior art.

In said drawings, Figure 1 is a side elevation of my drinking fountain attached to a supply header, shown in section. The receptacle is shown as full by the full lines and as empty in the dotted line position. Fig. 2 is a section taken about on the line 2—2 of Fig. 1, showing the receptacle and the means for supporting the same in plan view. Fig. 3 is a partial section of the water-supply regulating valve employed by me.

The drinking fountain may be attached to any suitable supply source, such as the header 1, and any desired number of fountains may be attached to a single header. This header may be elevated above ground a short distance. The header is provided with a communicating branch-stem 2 in which is interposed a stop-valve 3 whose rotatable barrel member $3^1$ is formed with a T-handle 4.

An internally-threaded sleeve 6 of the valve 3 is connected with an extension-pipe 7. This extension terminates in a vertically-directed outlet-fitting 8. A vertically-disposed rod 9 is attached to the upper end of the fitting 8, and supports a guard 11. This guard is rigidly attached to the rod 9 by any suitable means, as by soldering, and extends over the entire fountain. Its purpose is to keep the poultry from perching upon the receptacle 10 or any of the projecting parts, and so interfering with the operation of the device or fouling the water.

An arm 12 is rigidly attached to the T-handle 4, and depends therefrom. Its lower or free end 13 is bent upward, and forms a U-shaped arm. A ring 14 is adapted to support a pan or receptacle 10 of any convenient shape and size beneath the outlet 8. The ends 15 of this ring are bent outward radially of the ring and embrace the arm 12 and extension 13 therebetween. The opposing surfaces of said ends 15 and arm 12 may be roughened to form reliable engaging faces. A bolt 16 and nut 17 or any suitable clamping device, may be employed to clamp the ring upon arm 12. The height of the receptacle from the ground may be regulated as desired, to adapt the fountain to the use of large or small chickens, by adjusting the ends 15 of the ring up or down across the arm 12 and its bent end 13. A tension-spring 19 is attached at one end to ring 14, and at the other end to a hook supported upon an adjustable collar 21, which is mounted upon rod 9 and is secured for vertical adjustments thereon.

The operation of the device is as follows: When the pan is empty, the action of spring 19 draws it up into the position shown in dotted lines in Fig. 1. Arm 12, attached thereto, turns the T-handle 4 and valve-member $3^1$ sufficiently to open the valve, as shown by dotted lines in Fig. 3. The water flows from outlet 8 into the receptacle 10, and the weight of the accumulated water acts in opposition to spring 19, and the receptacle is lowered, gradually closing the valve. This action continues until the receptacle reaches the position shown in full lines in Fig. 1, when the valve is closed, as shown in full lines in Fig. 3, whereupon the water in the receptacle balances the spring 19. As the water is used by the poultry drinking therefrom, the weight reduces the spring and draws the arm 12 forwardly and opens the valve slightly and allows the water to drip. In practice it is found that with proper regulation of the tension spring 19, the water drips steadily at a rate that will maintain the water at a suitable elevation in the receptacle, which will compensate for the amount used by the poultry. At night when the fountain is not used the supply will be automatically closed and be renewed in the morning when the chicks again avail themselves of the supply. To regulate the amount of water required to close the valve, collar 21 may be raised or lowered. If it be desired to remove the pan to clean it, spring 19 is removed from hook 20, whereupon the weight of arm 12 and ring 14 will serve to keep valve 3 closed. It will also be evident that the flow of water to the receptacle is governed by the consumption or withdrawal therefrom and that the pressure of water in the header may be relatively great or only such as to flow therethrough while the apparatus will govern itself automatically.

What I claim, is—

1. In a poultry drinking fountain, in combination a liquid receptacle, a source of liquid supply, a valve attached thereto, the outlet from said valve being positioned over said receptacle, a ring supporting said receptacle, an arm attached to the stem of said valve, said arm being bent back upon itself near its outer end, the ends of said ring being bent outward radially thereof and embracing both portions of said arm, means for clamping said arm between the ends of said ring at any selected height, said valve being so arranged that it is closed when said receptacle is full, and a spring attached to said arm tending to raise said arm to thereby open said valve.

2. In a poultry drinking fountain, in combination, a source of liquid supply, a valve having a rotatable member attached thereto and provided with a T-handle rigidly secured to said rotatable member, an extension pipe attached to said valve and terminating in a vertically directed cross-T, a vertical rod screwed into the upper end of said cross-T and supporting a guard, an arm fixedly secured to the T-handle of said valve and depending therefrom, said arm being bent backward upon itself near its free end, a resilient ring having its ends bent outward and adapted to embrace both portions of said arm, means for clamping said ring upon said arm in a selected position, a liquid receptacle supported by said ring and adapted to close said valve when the receptacle is full, a spring attached at one end to said ring and tending to raise said receptacle to open said valve, the other end of said spring being attached to a collar clamped upon said rod above said cross-T and adjustable thereon, whereby the force necessary to close said valve may be regulated.

Signed at Seattle, Wash., this 22nd day of December, 1914.

MORTON CLARK.

Witnesses:
 JESSE A. FRYE,
 E. PETERSON.

Copies of this patent may be obtained for five cents each, by addressing the "Commissioner of Patents, Washington, D. C."